United States Patent [19]

Chopin et al.

[11] Patent Number: 5,348,581
[45] Date of Patent: Sep. 20, 1994

[54] RARE EARTH SESQUISULFIDE COMPOSITIONS COMPRISING ALKALI/ALKALINE EARTH METAL VALUES

[75] Inventors: Thierry Chopin, Saint Denis; Herve Guichon, La Courneuve; Olivier Touret, Aubervilliers, all of France

[73] Assignee: Rhone-Poulenc Chimie, Courbevoie Cedex, France

[21] Appl. No.: 985,859

[22] Filed: Dec. 4, 1992

[30] Foreign Application Priority Data

Dec. 4, 1991 [FR] France ................... 91 14988

[51] Int. Cl.$^5$ ............................. C09C 1/02
[52] U.S. Cl. .................. 106/461; 106/14.45; 106/287.32; 423/263; 423/265; 423/266; 423/275
[58] Field of Search ............... 423/263, 265, 266, 275; 106/14.45, 287.32, 461

[56] References Cited

U.S. PATENT DOCUMENTS

4,545,967  10/1985  Reynolds et al. ............ 423/263
4,765,931  8/1988   Saunders et al. ........... 252/584

FOREIGN PATENT DOCUMENTS

0203838A3  3/1286  European Pat. Off. .

OTHER PUBLICATIONS

Banks, "Cerium sulfide and selenide and some of their solid solutions", 1952, vol. 74.
Ballestraci, (Bull. Soc. Franc. Miner. Crist) 1965, pp. 207–210; 1964, pp. 512–517.
Chemical Abstracts, vol. 94, No. 4, Jan. 1981, Columbus, Ohio, abstract No. 24178F, H. Seta et al; Preparation of cerium sesquisulfide, p. 584.
Materials Research Bulletin, vol. 19, No. 9, 1984, pp. 1215–1220; M. Sato, Preparation & Structure of sodium rare-earth sulfides, p. 1216.
Gmelin Handbook of Inorganic Chemistry, 8th Edition, system No. 39, part C7, Berlin, 1983; pp. 597–605.
Int. Soc. Opt. Eng; Proc. SPIE, vol. 683, 1986, pp. 72–78, J. K. Saunders et al, p. 18.
Acta Crystallographyca, vol. 19, 1965, pp. 14–19, J. Flahaut et al, p. 18.
C.R. Acad. Sci., Serie II, vol. 307, No. 14, Nov. 7, 1988, Paris, pp. 1625–1628, P. Lemoine et al.

*Primary Examiner*—Helene Klemanski
*Assistant Examiner*—Scott L. Hertzog
*Attorney, Agent, or Firm*—Burns, Doane, Swecker & Mathis

[57] ABSTRACT

Unique compositions based on at least one crystalline rare earth sesquisulfide, well suited for the coloration of a wide variety of substrates, e.g., cosmetics, plastics, paints and rubbers, contain a dopant amount of at least one alkali/alkaline earth metal, at least a fraction of which being included within the crystal lattice of such at least one rare earth sesquisulfide.

38 Claims, No Drawings

RARE EARTH SESQUISULFIDE COMPOSITIONS COMPRISING ALKALI/ALKALINE EARTH METAL VALUES

BACKGROUND OF THE INVENTION

1. Field of the Invention

The present invention relates to novel compositions based on rare earth sulfides, and, more especially, to compositions based on rare earth sesquisulfides and comprising alkali and/or alkaline earth metal values, and having, inter alia, improved chromatic properties.

As utilized herein, by the term "rare earth elements" are intended the elements belonging to the lanthanide group of the Periodic Table having an atomic number of from 57 to 71, as well as yttrium which has an atomic number of 39.

2. Description of the Prior Art

The rare earth sesquisulfides, having the general formula $M_2S_3$, in which M represents at least one rare earth, are compounds per se known to this art and are widely described in the literature, patent and otherwise.

It too is known to this art, inter alia, that such rare earth sesquisulfides are useful pigment colorants for various substrates, such as, for example, plastics, paints and others. They are also used as detectors for the presence of sulfur, or for the production of materials which are optical windows, both for visible light as well as for the infrared.

By way of example, the use of rare earth sesquisulfides as pigment colorants has been described, in particular in EP-A-0,203,838, assigned to the assignee hereof and hereby expressly incorporated by reference.

For this particular use, it is found that the rare earth sesquisulfides to date known to this art have properties, in particular chromatic properties, which remain inadequate for the broad spectrum of such applications.

Another difficulty resides in the processing required for the synthesis of this type of compound.

The majority of processes for preparing monophase rare earth sesquisulfides of high purity entail solid/gas-type reactions.

Thus, these sulfides may be prepared by reacting hydrogen sulfide with a rare earth oxide at high temperature (see again EP-A-0,203,838) or under high pressure. The reaction of a sulfurizing agent, such as sulfur, $H_2S$ and/or $CS_2$, with a rare earth compound such as, for example, an oxide, a carbonate or an oxalate has also been described. Processes of this type are described, in particular, in FR-A-2,100,551, or in the article by Heindl and Loriers, *Bulletin de la Societe Chimique de France*, No. 303 (1974).

Nonetheless, the aforesaid prior art processes present the disadvantage in that they are not easily carried out, or cannot be carried out at all, on an industrial scale because they require either the use of $H_2S$ to produce a rare earth sesquisulfide free from oxysulfide values or temperature and/or pressure conditions incompatible with industrial production. Moreover, they are difficult to control and the parasitic or competing formation, together with the rare earth sesquisulfide having the desired crystalline phase, of a rare earth oxysulfide is difficult to prevent. Thus, the products obtained have inadequate chromatic coordinates and, moreover, the original color of the sesquisulfide may be degraded by, for example, a rare earth oxysulfide which does not have the desired color.

SUMMARY OF THE INVENTION

Accordingly, a major object of the present invention is the provision of novel compositions based on the rare earth sesquisulfides which exhibit, in particular, totally surprising and unique chromatic characteristics and, therefore, which are very particularly suited for use as pigment colorants.

Another object of the present invention is the provision of a unique process for the preparation of such compositions that can be carried out under conditions compatible with industrial production.

Briefly, the present invention features novel compositions based on at least one crystalline rare earth sesquisulfide having the formula $M_2S_3$, in which M represents at least one element selected from among the lanthanides and yttrium, such compositions being characterized in that they contain at least one alkali metal and/or alkaline earth metal element, at least a portion of which is included within the crystal lattice of said rare earth sesquisulfide.

DETAILED DESCRIPTION OF THE PREFERRED EMBODIMENTS OF THE INVENTION

More particularly according to the present invention, it will be appreciated that the subject rare earth sesquisulfides may contain one or more alkali metals, one or more alkaline earth metals, or mixtures of at least one alkali metal and at least one alkaline earth metal.

Hereinbelow, by the term "doping element" or "dopant" is intended either such at least one alkali metal or at least one alkaline earth metal, as well as any combination of alkali metal(s) and/or alkaline earth metal(s), as indicated above.

The doping element may be present in the composition in diverse forms. However, in a preferred embodiment of the instant invention, it is essentially present in a form combined with the rare earth sesquisulfides. In this event, the doping element is then irreversibly bonded to the sesquisulfides, in that, for example, even a very thorough washing of the latter does not remove or eliminate the dopant therefrom. To the contrary, washings of this type may effect removal of any alkali metal and/or alkaline earth metal sulfides and/or polysulfides which are present on the surface of the compositions and, thus, which are not irreversibly bonded thereto.

Without wishing to be bound to or by any particular theory, the following probable explanation is offered: it is known that the rare earth sesquisulfides $M_2S_3$ crystallize in a crystallographic structure of the $Th_3P_4$ type, which has gaps in the cation lattice; this lacunary structure may be symbolized by giving the sesquisulfides the formula $M_{10.66}[\square]_{1.33}S_{16}$. (In this regard see, in particular, W. H. Zachariasen, "Crystal Chemical Studies of the 5f-Series of Elements. The $Ce_2S_3$—$Ce_3S_4$ Type of Structure", *Acta Cryst.*, 2, 57 (1949)).

Now, according to the invention, alkali metal and/or alkaline earth metal elements may be introduced into these cationic gaps, optionally up to saturation of the latter.

The presence of the doping element within the compositions according to the invention may be demonstrated by simple chemical analysis. Moreover, X-ray diffraction analyses evidence that the $Th_3P_4$ crystal phase of the sesquisulfide is retained, with, in some instances, modification of the lattice constants to a greater or lesser extent, depending both on the nature and the amount of the dopant introduced.

Completely unexpectedly and surprisingly, it has now been determined that this insertion within the sesquisulfide crystal lattice confers chromatic characteristics on the compositions according to the invention that are distinctly improved compared with those of all of the rare earth sesquisulfides to date known to this art.

Moreover, the presence of such dopant may impart the beneficial effect of stabilizing the crystal structure of the sesquisulfide under consideration at high temperatures and thus preserve the desired color over a wider temperature range.

In a preferred embodiment of the compositions according to the invention, the doping element is an alkali metal and is, for example, selected, whether alone or in admixture, from among lithium, sodium and potassium.

More preferably, such alkali metal is sodium.

Particularly exemplary alkaline earth metals according to the invention include magnesium, calcium, barium and strontium.

In another embodiment of the invention, the molar amount of alkali metal(s) and/or alkaline earth metal(s) in the subject compositions is at least 0.1% and advantageously ranges from 5% to 50% of the molar amount of the rare earth or rare earths present therein.

The nature of the rare earth or rare earths, as well as the type of crystal lattice of the sesquisulfide, are selected in consequence of the color sought to be imparted to the composition. In all cases, it is found that, for a suitably selected doping element, the compositions according to the invention display colorations which are much deeper than those of the corresponding sesquisulfides not doped with an alkali metal and/or alkaline earth metal element; by "corresponding sesquisulfide" is intended the sesquisulfide containing the same rare earth or rare earths and having the same crystallographic structure.

For a given rare earth sesquisulfide, which thus has a given color, the invention then permits the provision of an entire range of improved colors after simple routine experiments and to accomplish this by adjusting only the nature and/or the concentration of the dopant.

Representative colors which can be provided are given below, it being understood that these are exemplary only:

(1) compositions based on cerium sulfides have a color varying from brown to red, depending on the preparative technique therefor, in particular the calcination temperature. These are brown or blood red depending on whether the $\zeta$ orthorhombic phase $Ce_2 1S_3$ (J.C.P.D.S. 20 269) or the $\upsilon$ cubic phase $Ce_2S_3$ (J.C.P.D.S. 27 104) is present;

(2) yellow compounds corresponding to a cubic structure $La_2S_3$ (J.C.P.D.S. 25 1041) are obtained with lanthanum;

(3) a green color can be obtained with neodymium and a green-yellow color with praseodymium. These have, respectively, the cubic structure $Nd_2S_3$ (J.C.P.D.S. 26 1450) and the cubic structure $Pr_2S_3$ (J.C.P.D.S. 27 481);

(4) a yellow-chestnut compound of cubic structure $Dy_2S_3$ (J.C.P.D.S. 26 594) is available with dysprosium;

(5) various chestnut shades may also be provided: ochre of cubic structure $Tb_2S_3$ with terbium, brown of monoclinic structure $Er_2S_3$ (J.C.P.D.S. 21 324) with erbium and deep beige of monoclinic structure $Y_2S_3$ (J.C.P.D.S. 22 996) with yttrium.

(6) finally, other examples of resultant coloration include brown-grey of cubic structure $Sm_2S_3$ (J.C.P.D.S. 26 1480) with samarium, brown-green of $\upsilon$ cubic structure $Gd_2S_3$ (J.C.P.D.S. 26 1424) with gadolinium and green-gold of monoclinic structure $Tm_2S_3$ (J.C.P.D.S. 30 1364) with thulium.

The coloration of the compositions according to the invention may be quantified by means of the chromatic coordinates L*, a* and b* given in the CIE system 1976 (L*, a*, b*) as defined by the International Lighting Commission and cataloged in the Compilation of French Standards (AFNOR), colorimetric color No. X08-12 (1983). They are determined using a colorimeter marketed by Pacific Scientific. The illuminant is of D65 type. The surface observed is a circular pellet having a surface area of 12.5 cm². The specular component is excluded from the measurements given.

L* is a measure of the reflectance (light/dark shading) and ranges from 100 (white) to 0 (black).

a* and b* are the values of the color trends.

a* positive=red a* negative=green b* positive=yellow b* negative=blue

L* thus represents the variation from black to white, a* the variation from red to green and b* the variation from yellow to blue.

Thus, by way of example, when the rare earth is cerium and the sesquisulfide is in its cubic $\upsilon$ crystallographic form, the composition according to the invention has the following chromatic coordinates:

(i) L* at least equal to 30 and in particular ranging from 30 to 55, (ii) a* at least equal to 30 and in particular ranging from 35 to 65, and (iii) b* generally ranging from 0 to 35.

These coordinates, and in particular a*, correspond to a deep red color which is exceptional for a $\upsilon$ cubic cerium sulfide $Ce_2S_3$ and is equivalent to or even better than that of the reference red pigments, namely, cadmium selenide and cadmium sulfoselenide.

For this reason, the compositions of the invention are advantageously used as pigments for the coloration of numerous substrates such as plastics and paints, for example. The pigments according to the invention do not present the toxicity problems associated with the presence of cadmium in certain pigments of the prior art.

In this application as pigments, the compositions according to the invention are in the form of powders having a particle size distribution such that the average diameter of the particles thereof generally ranges from about 0.2 $\mu$m to about 5 $\mu$m. It is then possible to impart an excellent coloration to the substrates into which they are incorporated.

As indicated above, this invention also features a unique process for the production of the subject compositions on an industrial scale.

It should be noted that this process is particularly suitable, inter alia, for providing compositions in which the rare earth sesquisulfide is in a cubic, and in particular $\upsilon$ cubic, crystalline form.

This process of the invention comprises producing an initial mixture containing at least one rare earth compound, sulfur and at least one compound of an alkali metal and/or alkaline earth metal element, heating said initial mixture under a nonoxidizing and advantageously reducing atmosphere, until the desired sesquisulfide phase is obtained, and then cooling the mixture thus treated.

In a preferred embodiment of the invention, the heating of the initial mixture is carried out in the presence of a reducing agent.

The amount of reducing agent added is determined such as to maintain a very low oxygen partial pressure in the reactor. Thus, the amount of reducing agent is advantageously sufficient to consume the free and/or combined oxygen contained in the initial mixture.

In another embodiment of the invention, a reducing agent is added to the initial mixture. This agent is generally based on carbon, such as, for example, graphite, coke or lignite, or is based on an organic compound generating carbon on heating. It may also be a metallic reducing agent, for example aluminum.

In yet another embodiment of the invention, the reducing agent is contained in the gas constituting the nonoxidizing atmosphere. The initial mixture is then advantageously swept with a nonoxidizing gas, preferably an inert gas, containing a reducing agent such as, for example, hydrogen or carbon monoxide CO. Thus, it is possible to use a mixture of hydrogen with an inert gas, such as an argon/hydrogen or nitrogen/hydrogen mixture, or else an argon/CO or nitrogen/CO mixture. The sweeping may also be carried out using hydrogen or carbon monoxide alone.

During the increase in temperature, it may be advantageous to maintain the mixture at an intermediate temperature, for example ranging from 250° C. to 500° C., before heating it to the temperature corresponding to the formation of the desired sesquisulfide. This holding at an intermediate temperature is carried out for a period of time generally ranging from 15 minutes to 1 hour.

Exemplary rare earth compounds suitable for carrying out the process of the invention include, for example, the oxygen- and carbon-containing rare earth compounds, rare earth sulfates and rare earth oxides.

Particularly representative oxygen- and carbon-containing rare earth compounds include the rare earth carbonates, oxalates, acetates, malonates and tartrates.

Exemplary alkali metal or alkaline earth metal compounds suitable for the invention include those selected from among an oxide, sulfide or polysulfide, sulfate or an oxygen- and carbon-containing compound, such as an oxalate, carbonate or acetate, of alkali metals or alkaline earth metals. Preferably, the carbonates are employed.

The amount of alkali metal or alkaline earth metal element added is determined such as to provide a molar ratio of doping element/rare earth(s) generally ranging from 0.05 to 0.5 and preferably from 0.15 to 0.30 in the initial mixture.

In addition, the amount of sulfur present in the initial mixture is determined such as to provide a molar ratio of sulfur/rare earth(s) of greater than or equal to 1.5 and preferably greater than 2.

The sulfur may be introduced in the free state (solid or gaseous elementary sulfur) or in the form of a sulfur-containing precursor compound, for example $Na_2S$.

Preferably, elemental sulfur in the solid state is used.

The initial mixture may, of course, contain a plurality of rare earth compounds and/or alkali metal compounds and/or alkaline earth metal compounds, as emphasized above.

The mixture is then heated at a temperature and for a period of time sufficient to produce the desired sesquisulfide phase, this time generally being the shorter the higher the temperature. Such temperature of course depends on the particular sesquisulfide in question.

Advantageously, the mixture is heated at a temperature higher than 900° C., generally ranging from 1,000° C. to 1,400° C. and preferably from 1,150° C. to 1,300° C., for at least 30 minutes and preferably for from 30 minutes to 2 hours.

The composition thus obtained may optionally be washed, for example with water, to diminish its content in unbonded alkali metal and/or alkaline earth metal.

If necessary, the resulting composition may finally be ground to provide an average particle diameter ranging from 0.2 μm to 5 μm. However, upon conducting the process of the invention, this particle size is generally obtained without having to grind the product, which is a very significant advantage from the economic standpoint. The final product obtained then has remarkably high chromatic coordinates in the specific color of the particular rare earth sesquisulfide under consideration.

In order to further illustrate the present invention and the advantages thereof, the following specific examples are given, it being understood that same are intended only as illustrative and in nowise limitative.

EXAMPLE 1

This example illustrates the preparation of a υ cubic cerium sesquisulfide $Ce_2S_3$ doped with sodium.

58 g of cerium oxalate $Ce_2(C_2O_4)_3.2\ H_2O$, 48 g of elementary sulfur and 2.65 g of anhydrous sodium carbonate were introduced into a mortar; the initial Na/Ce molar ratio was then 0.25. The entire mass was then ground such as to provide a very homogeneous mixture. This mixture was then placed in a carbon boat, which was introduced into an airtight tubular furnace. This furnace was purged and continuous sweeping was then carried out therein using argon charged with 10% of hydrogen.

The temperature of the furnace was increased to 325° C., at a rate of 5° C./min, with a one-hour plateau at this temperature. The temperature was then increased to 1,200° C., still at a rate of 5° C./min, again with a one-hour plateau at this temperature. The temperature was then returned to ambient temperature, the cooling being at a rate of 5° C./min.

The product recovered was then washed once with demineralized water. The product obtained then had a very deep red color. X-ray diffraction analysis evidenced that the single υ cubic phase $Ce_2S_3$ was obtained, with a lattice constant of 8.637 Å. The sodium content of the product was 2.8% by weight (Na/$Ce_2S_3$).

The chromatic coordinates of the final product were as follows:
$L^* = 40$
$a^* = 45$
$b^* = 20$ After simple deagglomeration (low-power grinding, of the air-jet type) of the product, a powder was obtained which had an average particle size ($\phi_{50}$) of 2.5 μm (determined using the CILAS laser granulometer).

EXAMPLE 2

The procedure of Example 1 was repeated exactly, except that 4.24 g of anhydrous sodium carbonate were used to prepare the initial mixture, such as to provide a Na/Ce molar ratio in the latter of 0.4.

The final product obtained had the following characteristics:
(a) Very deep red color
(b) $v$ cubic phase $Ce_2S_3$ with traces of $NaCeS_2$
(c) Lattice constant of 8.637 Å
(d) Sodium content of 4% by weight ($Na/Ce_2S_3$)
(e) Chromatic coordinates:
   $L^* = 32$
   $a^* = 40$
   $b^* = 22$

EXAMPLE 3

This example illustrates the preparation of a $v$ cubic cerium sesquisulfide $Ce_2S_3$ doped with potassium.

The procedure of Example 1 was repeated exactly, except that 4.5 g of anhydrous potassium carbonate were used to prepare the initial mixture, such as to provide a K/Ce molar ratio in the latter of 0.25.

The final product obtained had a deep red color, with the following characteristics:
(a) Single $v$ cubic phase $Ce_2S_3$
(b) Lattice constant of 8.696 Å
(c) Potassium content of 3.2% by weight ($K/Ce_2S_3$)
(d) Chromatic coordinates:
   $L^* = 39$
   $a^* = 39$
   $b^* = 17$ Note:

Compared with Examples 1 and 2 above, an increase in the lattice constant of the cubic structure was observed, which is explained by the fact that the radius of the potassium ion is larger than that of the gaps in the lattice. Conversely, as the radius of the sodium ion is essentially identical to that of the gaps present in a $v$ cubic structure, no change in the lattice constant was observed (Example 1); on increasing the amounts of sodium introduced (Example 2), the gaps were simply increasingly filled until the latter were saturated. These determinations therefore confirm the insertion of the doping elements within the crystal lattice of the sesquisulfides.

EXAMPLE 4

This example illustrates the preparation of a $v$ cubic lanthanum sesquisulfide $La_2S_3$ doped with potassium.

An initial mixture of:
(i) 59 g of lanthanum oxalate $La_2(Ce_2O_4)_3 \cdot 2 H_2O$,
(ii) 48 g of elementary sulfur, and
(iii) 4.24 g of anhydrous potassium carbonate was prepared.

The procedure of Example 1 was then repeated.

The final product obtained had a yellow color.

Its analysis by X-ray diffraction evidenced that essentially the $v$ cubic phase $La_2S_3$ was obtained, with traces of $KLaS_2$.

Its potassium content was 4% by weight ($K/La_2S_3$).
Its chromatic coordinates were as follows:
$L^* = 80$
$a^* = -3$
$b^* = 46$

EXAMPLE 5 (Comparative)

The procedure of Example 1 of EP-A-0,203,838 was duplicated.

A red-colored u cubic cerium sesquisulfide $Ce_2S_3$ was obtained which had the following chromatic coordinates:
$L^* = 35$
$a^* = 30$
$b^* = 14$

EXAMPLE 6 (Comparative)

The procedure of Example 3 of EP-A-0,203,838 was duplicated.

A yellow-colored $v$ cubic lanthanum sesquisulfide $La_2S_3$ was obtained which had the following chromatic coordinates:
$L^* = 70$
$a^* = -5$
$b^* = 39$ While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising (1) at least one crystalline rare earth sesquisulfide having the formula $M_2S_3$, in which M is at least one element selected from among the lanthanides and yttrium, and (2) a dopant amount of at least one alkali and/or alkaline earth metal, at least a fraction of said at least one alkali and/or alkaline earth metal being included within the crystal lattice of said at least one rare earth sesquisulfide and said sesquisulfide having a $Th_3P_4$ crystallographic structure.

2. The composition of matter as defined by claim 1, essentially all of said at least one alkali and/or alkaline earth metal being included within the crystal lattice of said at least one rare earth sesquisulfide.

3. The composition of matter as defined by claim 1, said at least one alkali and/or alkaline earth metal being included in the cation gaps within the crystal lattice of said at least one rare earth sesquisulfide.

4. The composition of matter as defined by claim 1, the molar amount of said at least one alkali and/or alkaline earth metal being at least 0.1% of the molar amount of said at least one element M.

5. The composition of matter as defined by claim 4, the molar amount of said at least one alkali and/or alkaline earth metal ranging from 5% to 50% of the molar amount of said at least one element M.

6. The composition of matter as defined by claim 1, comprising (2) at least one alkali metal.

7. The composition of matter as defined by claim 6, said at least one alkali metal comprising sodium.

8. The composition of matter as defined by claim 1, said at least one crystalline rare earth sesquisulfide comprising u cubic cerium sesquisulfide, $Ce_2S_3$.

9. The composition of matter as defined by claim 1, having the following chromatic coordinates:
$L^*$ of at least 30,
$a^*$ of at least 30, and
$b^*$ ranging from 0 to 35.

10. The composition of matter as defined by claim 9, wherein $L^*$ ranges from 30 to 55, $a^*$ ranges from 35 to 65, and $b^*$ ranges from 0 to 35.

11. The composition of matter as defined by claim 1, in particulate state and having an average particle size ranging from 0.2 $\mu$m to 5 $\mu$m.

12. The composition of matter as defined by claim 1, said at least one rare earth sesquisulfide having the formula $Ce_2S_3$.

13. The composition of matter as defined by claim 1, said at least one rare earth sesquisulfide having the formula $La_2S_3$.

14. The composition of matter as defined by claim 1, said at least one rare earth sesquisulfide having the formula $Nd_2S_3$.

15. The composition of matter as defined by claim 1, said at least one rare earth sesquisulfide having the formula $Pr_2S_3$.

16. The composition of matter as defined by claim 1, said at least one rare earth sesquisulfide having the formula $Dy_2S_3$.

17. The composition of matter as defined by claim 1, said at least one rare earth sesquisulfide having the formula $Tb_2S_3$.

18. The composition of matter as defined by claim 1, said at least one rare earth sesquisulfide having the formula $Er_2S_3$.

19. The composition of matter as defined by claim 1, said at least one rare earth sesquisulfide having the formula $Y_2S_3$.

20. The composition of matter as defined by claim 1, said at least one rare earth sesquisulfide having the formula $Sm_2S_3$.

21. The composition of matter as defined by claim 1, said at least one rare earth sesquisulfide having the formula $Gd_2S_3$.

22. The composition of matter as defined by claim 1, said at least one rare earth sesquisulfide having the formula $Tm_2S_3$.

23. A process for the preparation of the composition of matter as defined by claim 1, comprising (i) heating intimate admixture of at least one rare earth compound, sulfur and at least one alkali or alkaline earth metal compound, under a nonoxidizing atmosphere, to provide said rare earth sesquisulfide, and (ii) then cooling the admixture thus treated.

24. The process as defined by claim 23, said heating step (i) being conducted in the presence of a reducing agent.

25. The process as defined by claim 24, said reducing agent comprising carbon or a carbon precursor.

26. The process as defined by claim 24, said reducing agent comprising said nonoxidizing atmosphere.

27. The process as defined by claim 24, said reducing agent comprising hydrogen and/or carbon monoxide.

28. The process as defined by claim 23, said at least one rare earth compound comprising at least one sulfate or oxide.

29. The process as defined by claim 23, said at least one rare earth compound comprising at least one oxygen- or carbon-containing rare earth compound.

30. The process as defined by claim 29, said at least one rare earth compound comprising at least one carbonate, acetate, oxalate, tartrate or malonate.

31. The process as defined by claim 23, said at least one alkali or alkaline earth metal compound comprising at least one oxide, sulfide, polysulfide or sulfate.

32. The process as defined by claim 23, said at least one alkali or alkaline earth metal compound comprising at least one oxygen- or carbon-containing compound.

33. The process as defined by claim 32, said at least one alkali or alkaline earth metal compound comprising at least one carbonate, oxalate or acetate.

34. A pigmented substrate, the pigment of which comprising the composition of matter as defined by claim 1.

35. The composition of matter as defined by claim 1, at least a fraction of said at least one alkali and/or alkaline earth metal being irreversibly bonded to said at least one rare earth sesquisulfide.

36. A composition of matter comprising unground crystalline particles of a rare earth sesquisulfide having the formula $M_2S_3$, in which M is at least one element selected from among the lanthanides and yttrium, and a color enhancing amount of at least one alkali and/or alkaline earth metal included within the crystal lattice of said at least one rare earth sesquisulfide.

37. The composition according to claim 36, said particles having an average particle diameter ranging from 0.2 $\mu$m to 5 $\mu$m.

38. A pigment suitable for the coloration of substrates comprising crystalline particles of a rare earth sesquisulfide having the formula $M_2S_3$, in which M is at least one element selected from among the lanthanides and yttrium, and a color enhancing amount of at least one alkali and/or alkaline earth metal included within the crystal lattice of said at least one rare earth sesquisulfide.

* * * * *